(12) United States Patent
Kougkas et al.

(10) Patent No.: US 11,630,834 B2
(45) Date of Patent: Apr. 18, 2023

(54) LABEL-BASED DATA REPRESENTATION I/O PROCESS AND SYSTEM

(71) Applicants: Anthony Kougkas, Chicago, IL (US); Hariharan Devarajan, Chicago, IL (US); Xian-He Sun, Darien, IL (US)

(72) Inventors: Anthony Kougkas, Chicago, IL (US); Hariharan Devarajan, Chicago, IL (US); Xian-He Sun, Darien, IL (US)

(73) Assignee: ILLINOIS INSTITUTE OF TECHNOLOGY, Chicago, IL (US)

( * ) Notice: Subject to any disclaimer, the term of this patent is extended or adjusted under 35 U.S.C. 154(b) by 143 days.

(21) Appl. No.: 17/336,887

(22) Filed: Jun. 2, 2021

(65) Prior Publication Data
US 2021/0374152 A1 Dec. 2, 2021

Related U.S. Application Data

(60) Provisional application No. 63/033,256, filed on Jun. 2, 2020.

(51) Int. Cl.
*G06F 16/25* (2019.01)
*G06F 16/2457* (2019.01)
(Continued)

(52) U.S. Cl.
CPC .......... *G06F 16/254* (2019.01); *G06F 9/4881* (2013.01); *G06F 9/505* (2013.01);
(Continued)

(58) Field of Classification Search
None
See application file for complete search history.

(56) References Cited

U.S. PATENT DOCUMENTS

| 10,158,573 B1* | 12/2018 | Lee | H04L 47/125 |
| 2014/0373091 A1* | 12/2014 | Kirner | H04L 63/1416 |
| | | | 726/1 |
| 2020/0394077 A1* | 12/2020 | Jacob | G06F 9/4881 |

FOREIGN PATENT DOCUMENTS

EP 3301936 A1 * 4/2018 ......... H04L 67/2823

OTHER PUBLICATIONS

Abbasi et al, "Differentiated chunk scheduling for p2p video-on-demand system." 2011 IEEE Consumer Communications and Networking Conference (CCNC). IEEE, 2011, (Year: 2011).*

(Continued)

*Primary Examiner* — Uyen T Le
(74) *Attorney, Agent, or Firm* — Pauley Erickson & Swanson

(57) ABSTRACT

A system and method for executing input/output (I/O) tasks for clients in a distributed computing system. One or more I/O requests made by a client are received. The operation instructions for the request data in the I/O requests are separated from the request data. A data representation called data label (or label) is created for executing operation instructions of the I/O requests. A data label corresponds to each of the I/O request and includes a unique identifier, information to the source and/or destination for the request data, and an operation instruction separated from the request data. The data label is pushed into a distributed label queue and is dispatched to an individual worker node according to a scheduling policy. The worker node executes the I/O tasks by executing the dispatched data label. The system and method can execute I/O tasks independently and decoupled from the client applications.

20 Claims, 9 Drawing Sheets

(51) Int. Cl.
  G06F 9/48      (2006.01)
  G06F 9/50      (2006.01)
  G06F 16/2458   (2019.01)

(52) U.S. Cl.
  CPC ........ *G06F 9/5038* (2013.01); *G06F 16/2471* (2019.01); *G06F 16/24573* (2019.01)

(56) References Cited

OTHER PUBLICATIONS

Bauer, Michael, et al., "Legion: Expressing Locality and Independence with Logical Regions," SC'12: Proceedings of the International Conference on High Performance Computing, Networking, Storage and Analysis, IEEE, Nov. 10-16, 2012, pp. 1-11.
Kale, Laxmikant V., and Krishnan, Sanjeev, "Charm++ A Portable Concurrent Object Oriented System Based on C++," In Proceedings of the eighth annual conference on Object-Oriented Programming Systems, Languages, and Applications (OOPSLA), 1993, pp. 91-108.
Tiwari, Deevesh, et al., "Active flash: Towards Energy-Efficient, In-Situ Data Analytics on Extreme-Scale Machines," 11th {USENIX} Conference on File and Storage Technologies ({FAST} 13), 2013, pp. 119-132.
Docan, Ciprian, et al., "Dataspaces: An Interaction and Coordination Framework for Coupled Simulation Workflows," Cluster Computing, 2012, V. 15, No. 2, pp. 163-181.
Geambasu, Roxana, et al., "Comet: An active distributed key-value store," Proceedings of the 9th USENIX Symposium on Operating Systems Design and Implementation (OSDI), 2010, pp. 323-336.
Breitenfeld, M. Scot, et al., "DAOS for Extreme-Scale Systems in Scientific Applications," CoRR, arXiv preprint arXiv, 2017, vol. 1712.00423, (10 pages).
Das, Sudipto, et al., "ElasTraS: An Elastic Transactional Data Store in the Cloud." HotCloud 9, Jun. 15, 2009, pp. 131-142.
Berl, Andreas, et al., "Energy-Efficient Cloud Computing," The Computer Journal, 2010, vol. 53, No. 7, pp. 1045-1051.
Cheriere, Nathanaël, et al., "Lower Bounds for the Duration of Decommission Operations with Relaxed Fault Tolerance in Replication-based Distributed Storage Systems," PhD diss., Inria Rennes-Bretagne Atlantique, Dec. 2018 (32 pages).
Weil, S. A., et al., "Ceph: A Scalable, High-Performance Distributed File System," In Proceedings of 7th USENIX Symposium on Operating Systems Design and Implementation (OSDI), Seattle, Washington, Nov. 6-8, 2006 (27 pages).

* cited by examiner

LABEL-BASED DATA REPRESENTATION I/O PROCESS AND SYSTEM

CROSS REFERENCE TO RELATED APPLICATION

This application claims the benefit of U.S. Provisional Patent Application, Ser. No. 63/033,256, filed on 2 Jun. 2020. The provisional application is hereby incorporated by reference herein in its entirely and is made a part hereof, including but not limited to those portions which specifically appear hereinafter.

STATEMENT REGARDING FEDERALLY SPONSORED RESEARCH

This invention was made with government support under OCI-1835764 and CSR-1814872 awarded by National Science Foundation. The government has certain rights in the invention.

FIELD OF THE INVENTION

This invention relates generally to methods and system for executing I/O tasks in a distributed computing system, and more particularly, to an independently scheduled I/O task execution system and the methods therefor, using a label-based data representation.

BACKGROUND OF THE INVENTION

Large-scale applications, in both scientific and the BigData communities, demonstrate unique Input/Output (I/O) requirements that none of the existing storage solutions can unequivocally address. This has caused a proliferation of different storage devices, device placements, and software stacks, many of which have conflicting requirements. Each new architecture has been accompanied by new software for extracting performance on the target hardware. Parallel file systems (PFS) are the dominant storage solution in most large-scale machines such as supercomputers and HPC clusters and are therefore well understood in the storage community. However, PFS face many limitations.

To address this divergence in storage architectures and workload requirements, there is a need for a new, distributed, scalable, and adaptive I/O system to provide effective software-defined storage services and quality of service (QoS) guarantees for a variety of workloads on different storage architectures.

SUMMARY OF THE INVENTION

A general object of the invention is to provide effective organization, storage, retrieval, sharing and protection of data and support a wide variety of conflicting I/O workloads under a single platform.

Embodiments of this invention provide effective storage malleability, where resources can automatically grow or shrink based on the workload.

Embodiments of this invention provide effective support to synchronous and asynchronous I/O with configurable heterogeneous storage.

Embodiments of this invention leverage resource heterogeneity under a single platform to achieve application and system-admin goals.

Embodiments of this invention provide effective data provisioning, enabling in-situ data analytics and process-to-process data sharing.

Embodiments of this invention support a diverse set of conflicting I/O workloads, from HPC to BigData analytics, on a single platform, through managed storage bridging.

Embodiments of the invention provide a method using data labels as a new data representation for data transfer, storage and operation in a distributed computing system. The method includes receiving an I/O request made by a client, creating a data label as a new data representation corresponding to each of the I/O request, pushing the data label into a distributed label queue and executing operation instruction of the I/O request to the request data by executing the data label. The request data generally refers to the data the I/O request is instructed to act on (e.g. encapsulate, operate on, process, etc.), such as by a reading function, a write function, etc. The data label is a new data representation and desirably includes a unique identifier, a data pointer to a source and/or destination for the request data (e.g., a memory pointer, a file path, a server IP, or a network port) and an operation instruction for the request data based upon the I/O request made by the client (e.g., all functions, either client-defined or pre-defined, are stored in a shared program repository which servers have access to).

In some embodiments, the data label can further include a status indicator (e.g., a collection of flags) to indicate the data label's state (i.e., queued, scheduled, pending, cached, invalidated, prioritized, etc.).

In some embodiments, the unique identifier of the data label includes a timestamp given at creation of the data label and the timestamp can be one of the factors deciding the order of the distributed label queue.

Embodiments of the invention further include dispatching the data label from the distributed label queue to a worker node for executing the data label. The worker node is, for example, a storage server and is further managed by a worker manager module. The worker manager monitors the status of all the worker nodes in the system. Embodiment of the invention can include a plurality of worker nodes in the system. The dispatching of the data label can further include a plurality of scheduling policies (also commonly referred to as assignment schemes).

In some embodiments of the invention, the request data is separated into content data (e.g., raw data) and metadata. The content data is pushed into a data warehouse configured to temporarily hold data in the system. A metadata entry is created in an inventory for each of the content data pushed into the data warehouse. Each of the data warehouse and the inventory for the metadata entries can be embodied/implemented as a hashmap. A data label is created with the operation instruction and a unique identifier for the content data and the metadata. Each entry in the data warehouse is uniquely identified by a key which is associated with one or more data labels.

Embodiments of the invention provide a data task based I/O execution engine (or run time), described herein as a label-based I/O system (hereinafter "LABIOS"). The LABIOS system uses a data label as a new data representation, which is fully decoupled from the accompanying data system(s) and distributed. LABIOS is intended to operate within in the intersection of, for example, the traditional high-performance computing (HPC) and BigData systems. LABIOS desirably transforms I/O requests each into at least one data label, which desirably is a tuple of an operation and a pointer to the request data. Data labels are pushed from the client application to a distributed queue served by a label dispatcher. LABIOS workers (e.g., storage servers) execute the labels independently. Using labels, LABIOS can offer software-defined storage services and quality of service (QoS) guarantees for a variety of workloads on different storage architectures.

In some embodiments, the system interacts with the client by an application programming interface (API) that either intercepts I/O calls from the client applications using function call wrappers or uses native LABIOS calls.

LABIOS treats the instruction of a data operation (e.g., read-write-update-delete) separately from the content data and the metadata of the request data made by a client. Operation instructions are passed to a distributed queue and get scheduled to one or more worker nodes (i.e., storage servers). Content data are passed to a global distributed data repository and get pulled from the storage servers asynchronously. Metadata are passed to a global distributed inventory of data in the system.

The data label of this invention is effectively a tuple of one or more operations to perform and a pointer to its request data. It resembles a shipping label on top of a shipped package where information such as source, destination, weight, priority, etc., clearly describe the contents of the package and what should happen to it. In other words, labels of this invention encapsulate the instructions to be executed on a piece of data. All I/O operations (e.g., fread( ) or get( ), fwrite( ) or put( ), etc.,) are expressed in the form of one or more labels and a scheduling policy to distribute them to the servers.

Embodiments of the invention include a system for I/O operations in distributed computing environment, which includes: an API configured to receive an I/O request from the client; a label manager; a label dispatcher configured to dispatch the data label to the worker node according to configurable scheduling policies; worker nodes (e.g., storage servers); and a worker manager configured to monitor and coordinate each worker node, data label, and label queue. Embodiments of the invention can further include a system administrator, a global distributed data repository, a content manager configured to temporarily hold data and catalog manager configured to maintain both system and client metadata information (see FIG. 2). Each of these components can be implement on one or more computer systems, including processors, software instructions stored on non-transitory recordable media and implemented by the processors, and all network connections and hardware, such as are known in the currently conventional I/O technology.

In some embodiments, labels are a tuple of one or more operations to perform and a pointer to its input data and are structured as follows: label type (enum), uniqueID (u_int64), source and destination pointers (std::string), operation to be performed function pointer (std::string), a set of flags for the label state (std::vector<int>).

Other objects and advantages will be apparent to those skilled in the art from the following detailed description taken in conjunction with the appended claims and drawings.

DETAILED DESCRIPTION OF THE INVENTION

Figure 1:
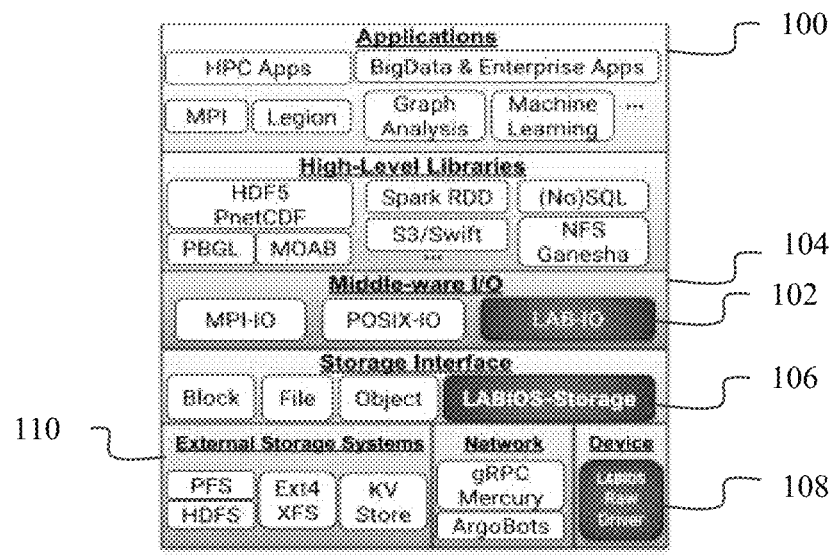
FIG. 1 illustrates a LABIOS system in software stack, according to one embodiment of this invention.

The present invention provides methods and systems for I/O task execution in a distributed computing system using data labels as data and/or task representations. As mentioned above, the data task based I/O execution engine of this invention will be referred to below as "LABIOS."

This invention provides effective storage malleability, where resources can automatically grow/shrink based on the workload. Applications' I/O behavior consists of a collection of I/O bursts. Not all I/O bursts are the same in terms of volume, intensity, and velocity. The storage system should be able to tune the I/O performance by dynamically allocating/deallocating storage resources across and within applications, a feature called data access concurrency control. Storage elasticity enables power-capped I/O, where storage resources can be suspended or shutdown to save energy. Much like modern operating systems shut down the hard drive when not in use, distributed storage solutions should suspend servers when there is no I/O activity.

This invention effectively supports synchronous and asynchronous I/O with configurable heterogeneous storage. A fully decoupled architecture can offer the desired agility and move I/O operations from the existing streamlined paradigm to a data-labeling one. In data-intensive computing where I/O operations are expected to take a large amount of time, asynchronous I/O and the data-labeling paradigm of this invention can optimize processing efficiency and storage throughput/latency.

This invention desirably leverages resource heterogeneity under a single platform to achieve application and system-admin goals. The hardware composition of the underlying storage should be managed by a single I/O platform. In other words, heterogeneity in hardware (RAM, NVMe, SSD, HDD) but also the presence of multiple layers of storage (e.g., local file systems, shared burst buffers, or remote PFS) should be transparent to the end client. The storage infrastructure should be able to dynamically reconfigure itself to meet the I/O demand of running applications and their I/O requirements. Moreover, storage Quality of Service (QoS) guarantees are a highly desired feature that can be achieved by efficiently matching the supply to the I/O demand.

This invention provides effective data provisioning, enabling in-situ data analytics and process-to-process data sharing. The I/O system should be programmable (e.g., policy-based provisioning and management). Storage must naturally carry out data-centric architectures, where data operations can be offloaded to the storage servers relieving the compute nodes of work such as performing data filtering, compression, visualization, deduplication, or calculating statistics (e.g., Software Defined Storage (SDS)). Offloading computation directly to storage and efficient process-to-process data sharing can significantly reduce expensive data movements and is a pinnacle of success for data-centric architectures.

This invention supports a diverse set of conflicting I/O workloads, from HPC to BigData analytics, on a single platform, through managed storage bridging. The I/O system desirably should abstract low-level storage interfaces and support multiple high-level APIs. Modern distributed computing makes use of a variety of storage interfaces ranging from POSIX files to REST objects. Moreover, existing datasets are stored in a universe of storage systems, such as Lustre, HDFS, or Hive. Storage solutions should offer developers the ability to use APIs interchangeably avoiding interface isolation and, thus, boost client productivity while minimizing programmability errors.

In embodiments of the invention, as illustrated in FIG. 1, LABIOS can be used either as a middleware I/O library 104 or as a full stack storage solution. Client applications 100 can use the LABIOS library 102 to perform I/O using labels and take advantage of the full potential of the system. Each label can carry a set of functions to be performed by the storage server that executes it. For instance, an application can push write labels and instruct LABIOS to first deduplicate entries, sort the data, compress them, and finally write them to the disk.

On the other hand, to maintain compatibility with existing systems, legacy applications can keep their I/O stack and issue typical I/O calls (e.g., fwrite( )). LABIOS will intercept those I/O calls, transform them into labels, and forward them to the storage servers. LABIOS can also access data via LABIOS raw driver 108 that handles data on the storage device in the form of labels. By adding more servers, the capacity and performance of them is aggregated in a single namespace. Furthermore, LABIOS can unify multiple namespaces by connecting to external storage systems 110, a feature that allows LABIOS to offer effective storage bridging.

Figure 2:
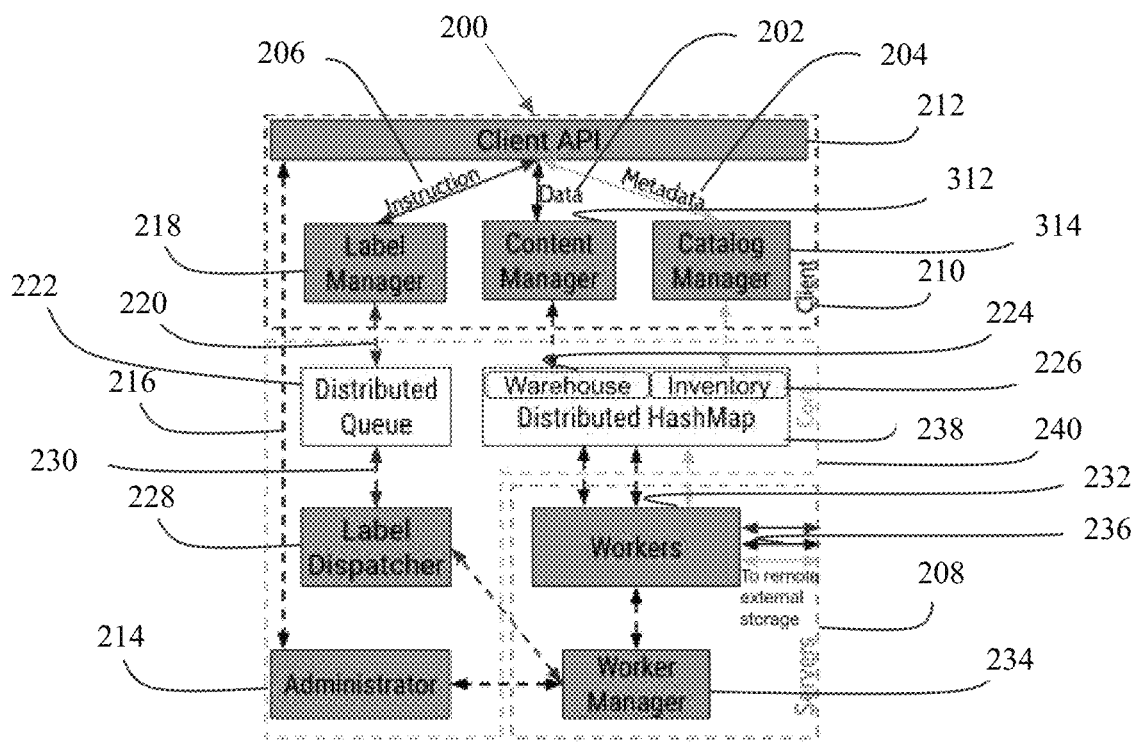
FIG. 2 shows an exemplary LABIOS high-level architecture, according to one embodiment of this invention.

As shown in FIG. 2, LABIOS 200 offers high speed data access to parallel applications by separating the content data 202, metadata 204, and the operation instruction 206, and also decoupling storage servers 208 from the client application 210. This decoupling of clients 210 and servers 208 is a significant architectural choice that enables several key features in LABIOS: the power of the asynchronous I/O, the effectiveness of data provisioning, and the proliferation of heterogeneous storage resources.

An incoming client application 210 first registers with LABIOS administrator 214, upon initialization 216, and passes workload-specific configurations to set up the environment. LABIOS receives the application's I/O requests via the client API 212, transforms them, using the label manager 218, into one or more labels (depending mostly on the request size), and then pushes 220 them into a distributed label queue 222. Clients content data 202 are passed to a distributed data warehouse 224 and a metadata entry is created in an inventory 226. A label dispatcher 228 implements the label queue 222, and distributes labels using several scheduling policies 230. Storage servers, called LABIOS workers 232, are organized into a worker pool via a worker manager 234 that is responsible to monitor the state of workers 232 and coordinate the workers 232. The worker manager 234 communicates with the administrator 214 and the label dispatcher 228. Workers 232 can be suspended by the worker manager 234 depending on the load of the queue, creating an elastic storage system that is able to react to the state of the workers 232. Lastly, workers 232 execute their assigned labels independently and operate on the data either on their own storage servers 208 or through a connection to an external storage system 236.

Figures 3, 4:
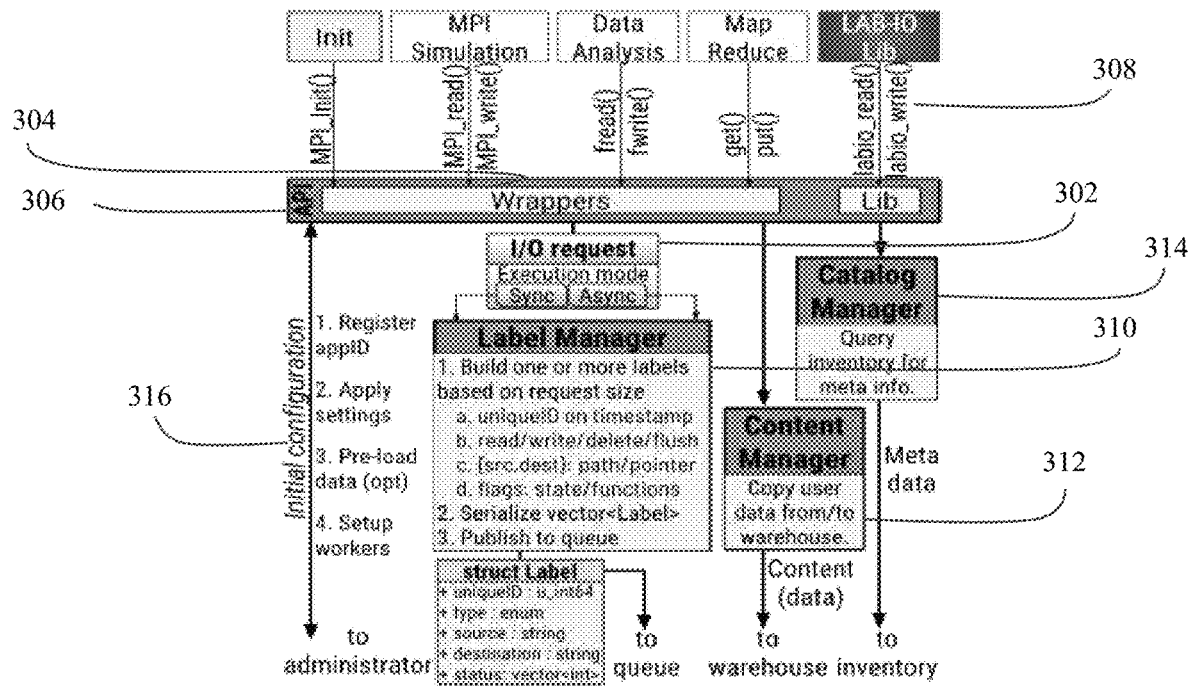
FIG. 3 illustrates subunits of LABIOS clients, according to one embodiment of this invention.
FIG. 4 shows an example of code snippet creating an asynchronous data label, according to one embodiment of this invention.
Figure 5:
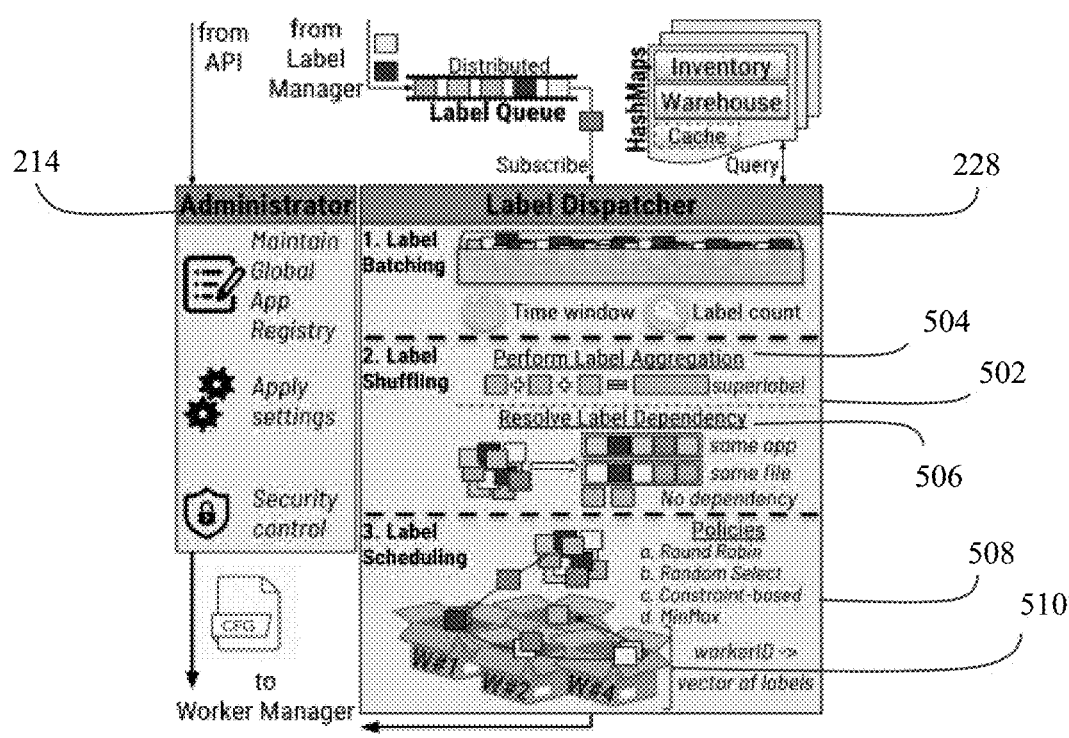
FIG. 5 illustrates subunits of a LABIOS core, according to one embodiment of this invention.
Figure 6:
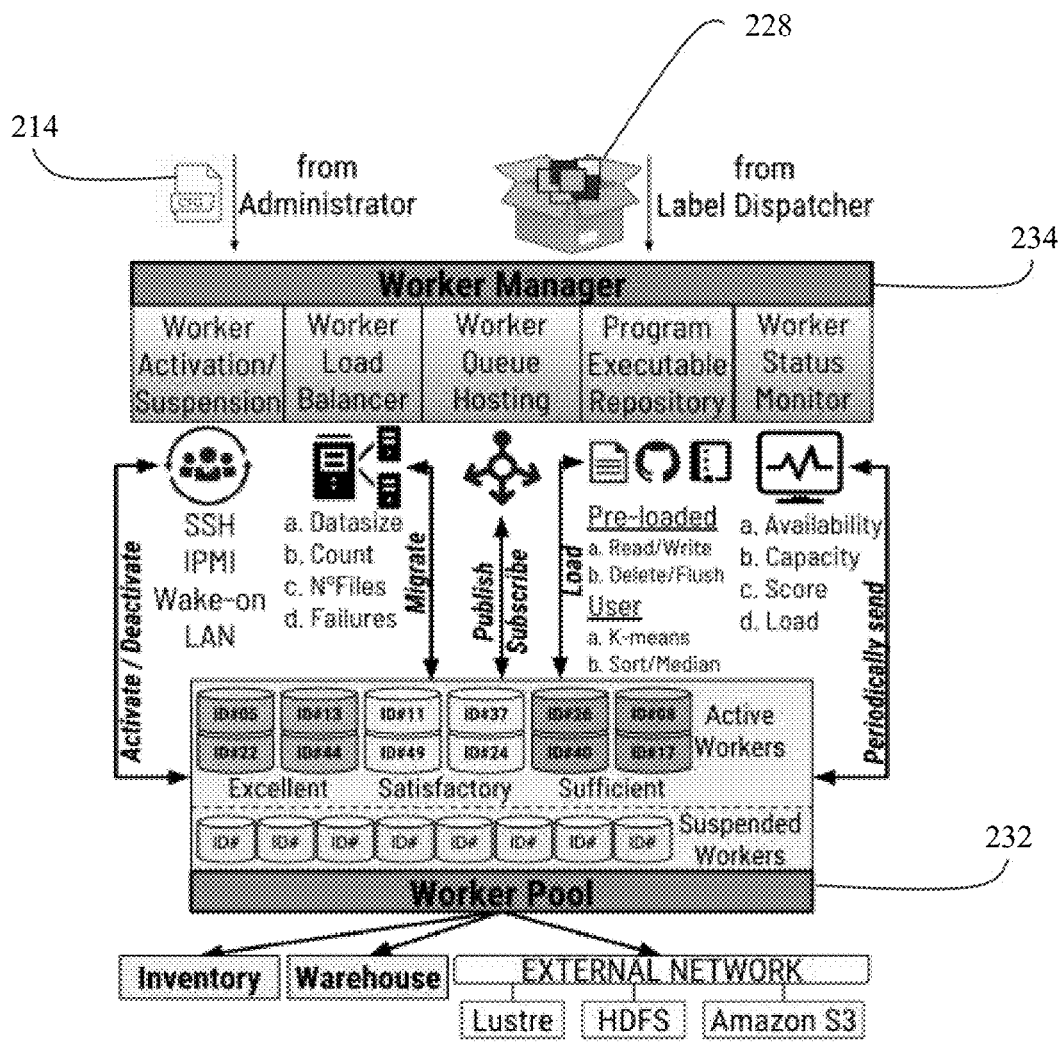
FIG. 6 illustrates subunits of a LABIOS server, according to one embodiment of this invention.

In embodiments of this invention, LABIOS includes three main components connected and configured together as shown in FIGS. 3, 5, and 6. As illustrated in FIG. 3, client 210 interacts with the client application and has three main goals: a) per-application system initialization 316 including register client application info (e.g., ID, group name, group credentials and permissions), apply application-specific settings, pre-load data from external sources (if needed), and setup LABIOS workers; b) accept client application I/O requests 302, either by intercepting existing I/O calls using function call wrappers 304 or by using native LABIOS calls 308 through a label API 306; and c) build labels based on the incoming I/O request 302.

An API 306 can be exposed to the client application to interact with data. The API 306 expresses I/O operations in the form of labels. The API includes, for example, calls to create-delete, publish-subscribe labels, among others. API 306 offers higher flexibility and enables software defined storage capabilities. As an example, the code snippet of FIG. 4 creates an asynchronous label which reads a file that includes a collection of integers from an external PFS using the MPI-IO driver, calculates the median value, and passes only the result back to the application via asynchronous I/O.

The Label Manager 310 builds one or more labels based on the request characteristics (e.g., read/write, size, file path, etc.), and serializes and publishes them to the distributed label queue. Each label gets a unique identifier based on the origin of the operation and a timestamp (e.g., in nanoseconds), which ensures the order of operations (i.e., this is a constraint in the priority queue). Labels can be created by a configurable size parameter within a range of min and max values (e.g., min 64 KB-max 4 MB). The data size parameter in each label is the unit of data distribution in the system. An I/O request larger than the maximum label size can be split into more labels creating a 1-to-N relationship between request and number of labels (e.g., for a 10 MB fwrite( ) and 1 MB max label size, 10 labels can be created). Any I/O request smaller than the minimum label size can be cached and later aggregated in a special indexed label to create a N-to-1 relationship between number of requests and label (e.g., for ten 100 KB fwrite( ) and 1 MB max label size, one label can be created). Lastly, these thresholds can be bypassed for certain operations, mostly for synchronous reads. Setting min and max label size values is dependent on many system parameters such as memory page size, cache size, network type (e.g., TCP buffer size), and type of destination storage (e.g., HDDs, NVMe, SSDs). LABIOS can be configured in a synchronous mode, where the application waits for the completion of the label, and in asynchronous mode, where the application pushes labels to the system and goes back to computations. A waiting mechanism, much like a barrier, can be used to check the completion of a single or a collection of asynchronously issued labels. The async mode can significantly improve the system's throughput but it also increases the complexity of data consistency and fault tolerance guarantees.

Content Manager 312 is mainly responsible for handling client content data inside a data warehouse (FIG. 2). The data warehouse 224 is desirably implemented by a distributed hashmap 238 (e.g., a key-value store), it temporarily holds data in-memory effectively serving as a bridge between clients and workers. An example of a data warehouse 224 is a collection of system-level structures (i.e., tables in the distributed key-value store), that are application-specific, and has the following requirements: highly available, concurrent data access, fault tolerant, and high throughput.

The content manager 312 exposes the data warehouse 224 via a simple get/put/delete interface to both the clients and the workers 232. The size and location of the data warehouse 224 is configurable based on several parameters such as number of running applications, application job size(s), dataset aggregate size, and number of nodes (e.g., one hashtable per node, or per application). Every entry in the data warehouse 224 is uniquely identified by a key which is associated with one or more labels. The content manager 312 can also create ephemeral regions of the data warehouse 224 (e.g., temporary rooms) which can be used for workflows where data are shared between processes. Data can flow through LABIOS as follows: from an application buffer to the data warehouse 224, and from there to worker storage for persistence or to another application buffer. Lastly, the content manager 312 also desirably provides a cache to optimize small size data access. I/O requests 302 smaller than a given threshold are kept in a cache and, once aggregated, a special label is created and pushed to the distributed queue to be scheduled to a worker (much like memtables and SSTables in LevelDB). This minimizes network traffic and can boost the performance of the system.

Catalog Manager 314 is responsible to maintain both client metadata 204 and system metadata information in an inventory 226, implemented by a distributed hashmap 238, as shown in FIG. 2. The catalog manager 314 exposes an interface for each application to query and update the entries within the inventory 226. Decentralization of the catalog services makes the system scalable and robust. Multiple concurrent processes can query the inventory 226 at the same time. For concurrent updates, LABIOS adopts the semantics of the underlying distributed hashmap 238 with high-availability and concurrent access ensuring the correctness and high throughput of catalog operations. LABIOS also offers the flexibility to place the inventory 226 in memory for high performance, protected by triple replication for fault tolerance. However, this increases the memory footprint of LABIOS and can depend on the availability of resources. The organization of inventory entries depends on the data model (files, objects, etc.) and/or high-level I/O libraries and middleware. For instance, for POSIX files the inventory entries may include filename to file stat, file handler to filename, file handler to file position in offset, filename to a collection of labels, and others. An HDF5 or a JSON file can have different inventory entries.

LABIOS-specific inventory information includes label status (e.g., in-transit, scheduled, pending), label distribution (e.g., label to workerID), label attributes (e.g., ownership, flags), and location mappings between client data and LABIOS internal data structures (e.g., a client's POSIX file might be stored internally as a collection of objects residing in several workers).

Also, in embodiments of the invention when LABIOS is connected to an external storage system 110, LABIOS can rely on any external metadata service. LABIOS becomes a client to the external storage system 110 and 'pings' the external metadata service to acquire needed information. LABIOS does not need to keep a copy of their respective metadata internally to avoid possible inconsistent states.

LABIOS core 240 (FIGS. 2 and 5) is responsible to manage the operation instruction 206, content data 202, and metadata 204 separately. The core 240 can includes an administrator 214 to maintain the system state by keeping track of all running applications in a global registry, setting up the environment per application (e.g., boot up exclusive workers if needed, pre-load data from external sources, etc.), and performing security control via client authentication and access permission checks. The distributed label queue 222 generally has the following requirements: high message throughput, always on and available, at-most-once delivery guarantees, highly concurrent, and fault tolerant. These features ensure data consistency since the label dispatcher can consume labels once and in order. The queue concurrency ensures that multiple dispatchers can service the same queue or one dispatcher multiple queues. The number of queues is configurable based on the load (e.g., one queue per application, or one queue per 128 processes, or one queue per node).

The label dispatcher 228 subscribes to one or more distributed label queues and dispatches labels to workers using several scheduling policies (also sometimes referred to as assignment schemes). The label dispatcher is desirably multi-threaded and can run on one or more nodes depending on the size of the cluster. LABIOS dispatches labels based on either a time window or the number of labels in the queue; both of those parameters being configurable. For example, the dispatcher can be configured to distribute labels one by one or in batches (e.g., every 1000 labels). To avoid stagnation, a timer can also be used; if the timer expires, LABIOS will dispatch all available labels in the queue. Furthermore, the number of label dispatchers 228 is desirably dynamic and depends on the number of deployed queues. There is a fine balance between the volume and velocity of label production stemming from the applications and the rate at which the dispatcher handles them. The relationship between the dispatcher 228 and queuing system increases the flexibility and scalability of the platform and provides an infrastructure to match the rate of incoming I/O.

FIG. 5 shows an example of the label dispatcher 228 which consists of two phases. First is a label shuffling 502, which takes a vector of labels as an input and shuffles them based on type and flags. Two operations are performed by the shuffler: first is data aggregation 504, which labels that reflect client's requests in consecutive offsets can be combined to one larger label to maintain locality (this feature can be turned on or off), and second is label dependencies 506, which data consistency must be preserved for dependent labels. For example, for a read after write pattern, LABIOS will not schedule a read label before the dependent write label completes. To resolve such dependencies, the shuffler can create a special label, called supertask, which embodies a collection of labels that need to be executed in strictly increasing order. After sorting the labels and resolving dependencies, the shuffler sends labels either to the solver to get a scheduling scheme, or directly to the assigner depending on the type (e.g., a read label is preferably assigned to the worker that holds the data to minimize worker-to-worker communication). The second phase is label scheduling 508, which takes a vector of labels as an input and produces a dispatching plan. For a given set of labels and workers, the scheduler answers three main questions: how many workers are needed, which specific workers, and which labels are assigned to which workers?

Label scheduling 508 may include several scheduling policies. One exemplary policy is Round Robin, whereby given a set of labels and a list of available workers, the dispatcher will distribute labels in a round robin fashion, much like a PFS does. The responsibility of activating workers and compiling a list of available workers for every scheduling window falls under worker manager. This policy demonstrates low scheduling cost but additional load balancing between workers might occur. Another exemplary policy is Random Select, whereby given a set of labels, the dispatcher will distribute labels to all workers randomly regardless of their state (i.e., active or suspended). This policy helps ensure the uniform distribution of workload between workers, low scheduling cost, but with no performance guarantees (i.e., possible latency penalty by activating suspended workers, or lack of remaining capacity of worker, etc.). Another exemplary policy is Constraint-based, whereby LABIOS provides the flexibility to express certain priorities on the system. Through the weighting system of worker scores, the dispatcher will distribute labels to workers based on the constraint with higher weight value. The constraints used are: availability, active workers will have higher score; worker load, based on worker queue size; worker capacity, based on worker remaining capacity; performance, workers with higher bandwidth and lower latency get a higher score. For a given set of labels, the dispatcher 228 requests a number of workers with the highest score, respective to the prioritized constraint, from the worker manager and distributes the labels evenly among them. The number of workers needed per a set of labels is automatically determined by LABIOS based on the total aggregate I/O size and the selected constraint balancing parallel performance and efficiency. These heuristics can be configured and further optimized based on the workload. Another exemplary policy is MinMax, whereby given a set of labels and a collection of workers, the dispatcher 228 aims to find a label assignment that maximizes I/O performance while minimizing the system energy consumption, subject to the remaining capacity and load of the workers; essentially a minmax multidimensional knapsack problem, a well-known NP-hard combinatorial optimization problem. LABIOS can solve this problem using an approximate dynamic programming (DP) algorithm, which optimizes all constraints from the previous policy. This policy gives a near-optimal matching of labels—workers but with a higher scheduling cost.

A map of {workerID, vector of labels} 510 is passed to the worker manager to complete the assignment by publishing the labels to each individual worker queue. Labels are published in parallel using a thread pool. The number of threads in the pool depends on the machine the label dispatcher 228 is running on as well as the total number of available workers.

FIG. 6 shows an exemplary LABIOS server that is responsible for managing the storage servers and has two main subcomponents: Workers 232 are essentially the storage servers in LABIOS. The workers 232 desirably are fully decoupled from the client applications, are multithreaded, and run independently. Worker responsibilities include: service its own queue; execute labels; calculate its own worker score and communicate it to the worker manager; auto-suspend itself if there are no labels in its queue for a given time threshold; and connect to external storage sources.

The worker score of this invention is a new metric that encapsulates several characteristics of the workers 232 into one value which can then be used by the label dispatcher to assign any label to any appropriate worker. A higher scored worker is expected to complete the label faster and more efficiently. The score is calculated by every worker independently at an interval or if substantial change of status occurs, and examples of the score include: (i) availability: 0 not-available (i.e., suspended or busy), 1 available (i.e., active and ready to accept labels); (ii) capacity: (double) [0,1] based on the ratio between remaining and total capacity; (iii) load: (double) [0,1] based on the ratio between worker's current queue size and max queue size (the max value is configurable); (iv) speed: (integer) [1,5] based on maximum bandwidth of worker's storage medium and grouped based on ranges (e.g., 1: <=200 MB/s, 2: 200-550 MB/s, . . . 5: >=3500 MB/s); (v) energy: (integer) [1,5] based on workers power wattage on full load (e.g., an ARM-based server with flash storage consumes less energy than a Xeon-based server with a spinning HDD).

The first three scores are dynamically changing based on the state of the system whereas speed and energy variables are set during initialization and remain static. Lastly, each variable is multiplied by a weight. LABIOS' weighting system is set in place to express the scheduling policy prioritized (examples shown below).

| Priority | Availability | Capacity | Load | Speed | Energy |
| --- | --- | --- | --- | --- | --- |
| Low latency | 0.5 | 0 | 0.35 | 0.15 | 0 |
| Energy savings | 0 | 0.15 | 0.2 | 0.15 | 0.5 |
| High bandwidth | 0 | 0.15 | 0.2 | 0.15 | 0.5 |

For instance, if energy consumption is the constraint that the label dispatcher aims to optimize then the energy variable gets a higher weight. The final score is a float in range between 0 and 1 and is calculated as:

$$\text{Score}(\text{workerID}) = \Sigma_{n=1}^{5} \text{Weight}_j \times \text{Variable}_j$$

In embodiments of this invention, a worker manager 234 is responsible for managing the workers 232, with responsibilities such as: maintain worker statuses (e.g., remaining capacity, load, state, and score), such as in a distributed hashmap (in-memory or on disk); host the worker queues; perform load balancing between workers; and dynamically commission/decommission workers to the pool. The worker manager 234 is connected to the administrator 214 for accepting initial configurations for incoming applications, and to the label dispatcher 228 for publishing labels in each worker's queue. The worker manager 234 can be executed independently on its own node by static assignment, or dynamically on one of the worker nodes by election among workers. In a sense, the worker manager 234 partially implements objectives similar to other cluster resource management tools such as Zookeeper, or Google's Borg. A performance-critical goal of the worker manager 234 can be to maintain a sorted list of workers 232 based on their score. Workers 232 update their scores constantly, independently, and in a non-deterministic fashion, as discussed above. Therefore, the challenge is to be able to quickly sort the updated scores without decreasing the responsiveness of the worker manager 234. LABIOS can address this issue by a custom sorting solution based on buckets. The set of workers 232 are divided on a number of buckets (e.g., high, medium, and low scored workers) and an approximate bin sorting algorithm is applied. A worker score update will only affect a small number of buckets and the complexity time is relevant to the size of the bucket. Lastly, the worker manager 234 can send activation messages to suspended workers 232 either by using the administrative network, if it exists, (i.e., ipmitool—power on), or by a custom solution based on ssh connections and wake-on-lan tools.

The LABIOS design and architecture promotes a main objective of supporting a diverse variety of conflicting I/O workloads under a single platform. However, additional features could be derived from LABIOS label paradigm: (1) Fault tolerance. In the traditional streamlined I/O paradigm, if an fwrite( ) call fails the entire application fails and it must restart to recover (i.e., using check-pointing mechanisms developed especially in the scientific community). The LABIOS label granularity and decoupled architecture could provide the ability to repeat a failed label and allow the application to continue without restarting. (2) Energy-awareness. First, LABIOS' ability to dynamically commission/decommission workers to the pool creates an elastic storage solution with tunable performance and concurrency control but also offers a platform that could leverage the energy budget available. One could observe the distinct compute-PO cycles and redirect energy from compute nodes to activate more LABIOS workers for an incoming I/O burst. Second, the LABIOS support of heterogeneous workers can lead to energy-aware scheduling where non mission-critical work would be distributed on low-powered storage nodes, effectively trading performance for power consumption. (3) Storage containerization. Virtualization can be a great fit for LABIOS' decoupled architecture. Workers can execute multiple containers running different storage services. For instance, workers can host one set of containers running Lustre servers and another running MongoDB. The worker manager can act as the container orchestrator and the label dispatcher could manage hybrid workloads by scheduling labels to both services under the same runtime.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Figure 7:
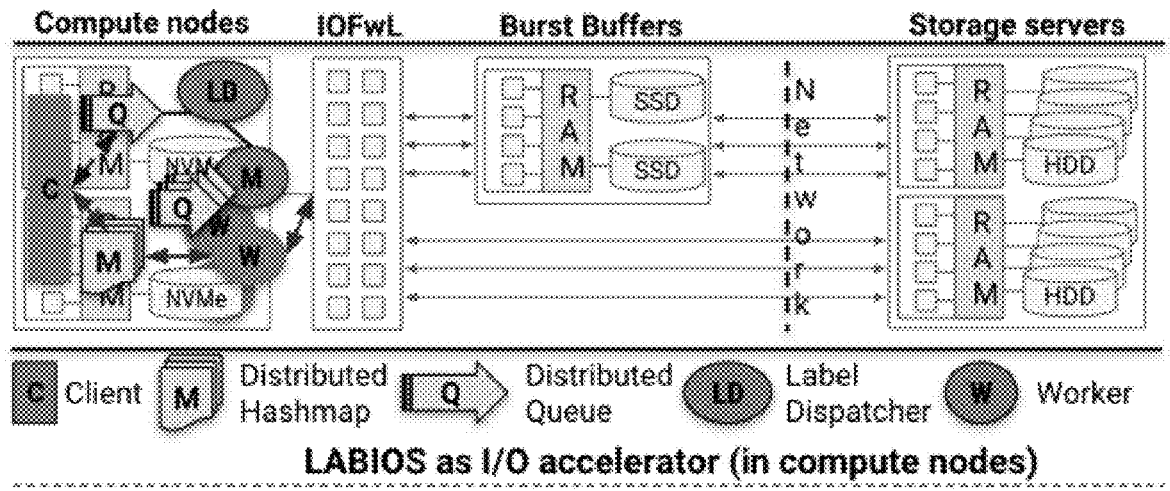
FIG. 7 shows LABIOS used as an I/O accelerator (in compute nodes), according to one embodiment of this invention.
Figure 8:
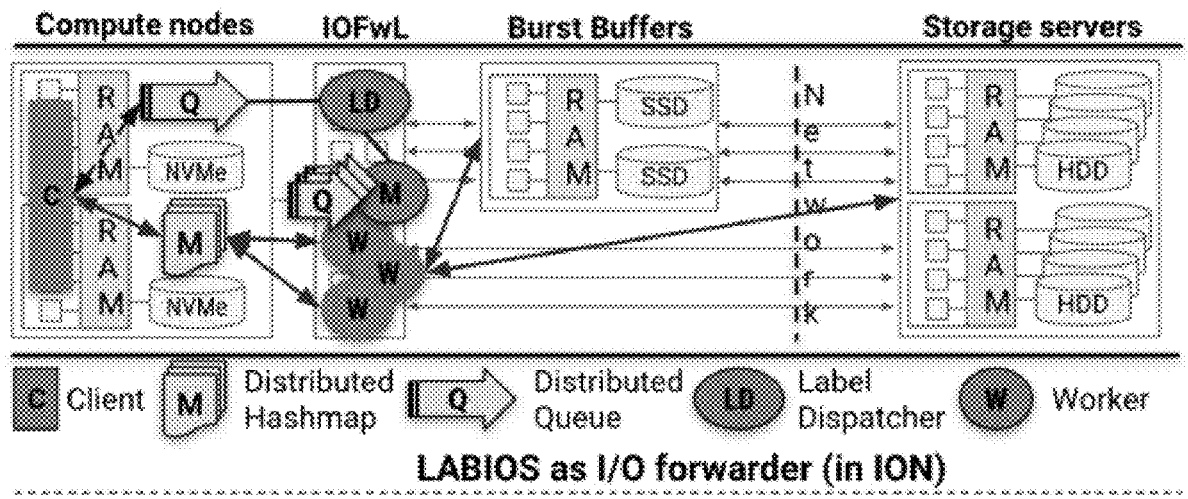
FIG. 8 shows LABIOS used as an I/O forwarder (in ION), according to one embodiment of this invention.
Figure 9:
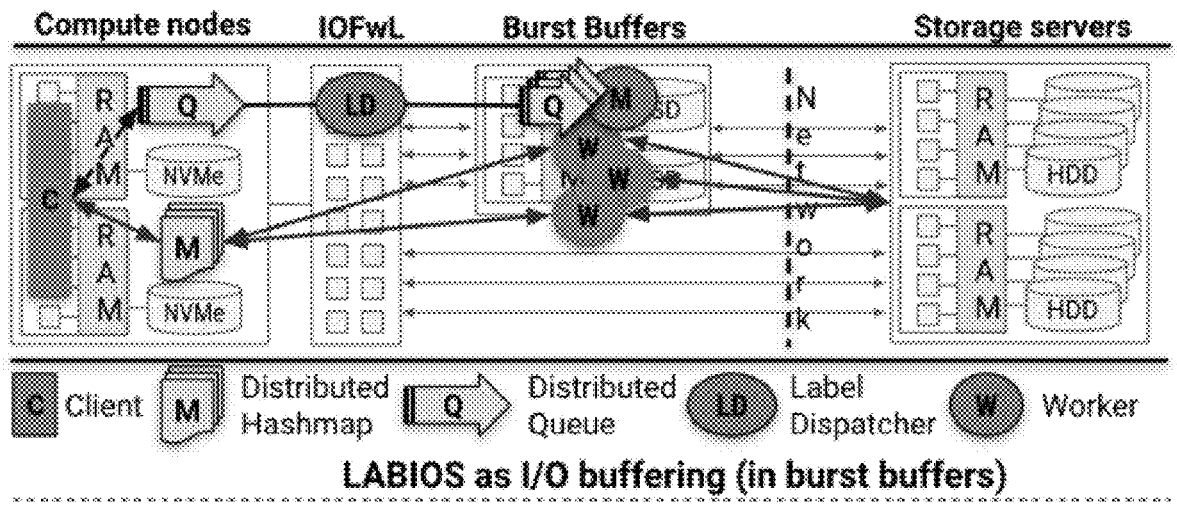
FIG. 9 shows LABIOS used for I/O buffering (in burst buffers), according to one embodiment of this invention.
Figure 10:
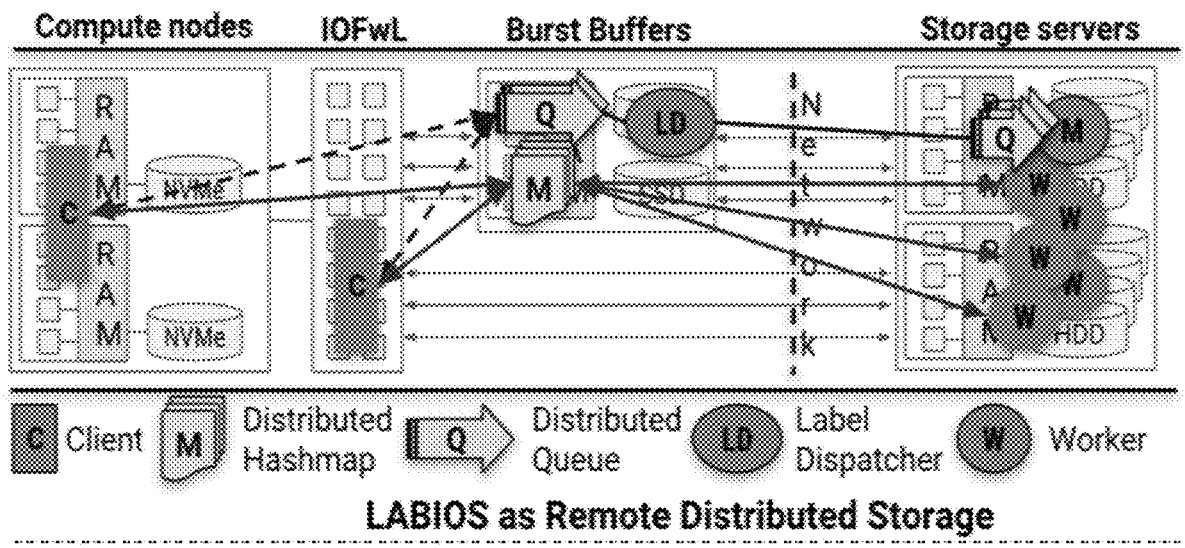
FIG. 10 shows LABIOS used as a remote distributed storage, according to one embodiment of this invention.

Examples of LABIOS' flexible and decoupled architecture can be seen in the several ways the system can be deployed. Depending on the targeted hardware and the availability of storage resources, LABIOS can: a) replace an existing parallel or distributed storage solution, or b) be deployed in conjunction with one or more underlying storage resources as an I/O accelerator (e.g., burst buffer software, I/O forwarding, or software-defined storage in client space). Leveraging the latest trends in hardware innovation, the machine model used as basis for several deployment schemes is as follows: compute nodes equipped with a large amount of RAM and local NVMe devices, an I/O forwarding layer~\cite{iskra2008zoid}, a shared burst buffer installation based on SSD equipped nodes, and a remote PFS installation based on HDDs (motivated by the recent machines Summit in ORNL or Cori on LBNL). Below are four equally appropriate deployment examples that can cover different workloads:

1. LABIOS as I/O accelerator (FIG. 7): Client runs on compute nodes and the distributed queue and hashmaps are placed on each node's memory for lower latency and higher throughput. The label scheduler runs on a separate compute node serving one or more queues per node, and lastly, one core per node can execute LABIOS worker, who stores data in the local NVMe. This mode can be used as a fast-distributed cache for temporary I/O or on top of other external sources. It is also ideal for Hadoop workloads with node-local I/O. However, it must use some compute cores to run its services and I/O traffic will mix with the compute network.
2. LABIOS as I/O forwarder (FIG. 8): Client runs on compute nodes and the distributed queue and hashmaps are placed on compute nodes' memory or NVMe. The label scheduler and workers run on the I/O nodes of the forwarding layer. This mode is ideal for asynchronous I/O calls where applications pass their data to LABIOS which pushes them in a non-blocking fashion to remote storage, either native to the system or external. However, its scalability is limited by the size of the I/O forwarding layer.
3. LABIOS as I/O buffering (FIG. 9): Client runs on compute nodes and the distributed queue and hashmaps are placed on compute nodes' memory or NVMe. The label scheduler can be deployed either in compute or I/O forwarder nodes, serving one or more client queues. Workers are deployed on the burst buffer nodes utilizing the SSD devices to store data. This mode is ideal for fast temporary storage, data sharing between applications, and in-situ visualization and analysis. Requires additional storage and network resources (i.e., burst buffer infrastructure).
4. LABIOS as remote distributed storage (FIG. 10): this can be achieved with various combinations of deploying LABIOS components in different nodes in the cluster. For instance, a natural fit in our machine model is running the client in the I/O forwarding nodes, the distributed queue and hashmaps on the burst buffers, and the workers on the storage servers, effectively replacing a PFS. This mode offers better system scalability by scaling each individual component independently, better resource utilization, and higher flexibility to the system administrator. For instance, one can increase the number of client queues in scenarios when label production is high or deploy more dispatchers to distribute labels faster. It has, however, higher deployment complexity. LABIOS' fully decoupled architecture provides greater flexibility and promotes scalability; I/O scales along with the application by simply provisioning additional resources.

All experiments were conducted on a bare metal configuration offered by Chameleon systems. The total experimental cluster consists of 64 client nodes, 8 burst buffer nodes, and 32 storage servers. Each node has a dual Intel® Xeon® CPU E5-2670 v3 @ 2.30 GHz (i.e., a total of 48 cores per node), 128 GB RAM, 10 Gbit Ethernet, and a local HDD for the OS. Each burst buffer node has the same internal components but, instead of an HDD, it is equipped with SSDs. The cluster OS is CentOS 7.1, the PFS used is OrangeFS 2.9.6.

Workloads Used:
(1) CM1 (final output, write-intensive)}: CM1 is a multi-dimensional, non-linear, numerical model designed for idealized studies of atmospheric phenomena~\cite{cm1paper}. CM1's I/O workload demonstrates a sequential write pattern. The simulation periodically writes collectively its results (e.g., atmospheric points with a set of features) using MPI-IO. Data are written in a binary GrADS format with a shared file access pattern. This workload requires persistence, fault-tolerance, and highly concurrent file access.

(2) HACC (check-pointing, update-intensive)}: HACC stands for Hardware Accelerated Cosmology Code and is a cosmological simulation that studies the formation of structure in collision-less fluids under the influence of gravity in an expanding universe. Each process in HACC periodically saves the state of the simulation along with the dataset using POSIX and a file-per-process pattern. Since HACC runs in time steps, only the last step checkpoint data is needed. Thus, the I/O workload demonstrates an update-heavy pattern. A major performance improvement in HACC workflow is the addition of burst buffers that absorb the checkpointing data faster and perform the last flush of data to the remote PFS.

(3) Montage (data sharing, mixed read/write)}: Montage is a collection of programs comprising an astronomical image mosaic engine. Each phase of building the mosaic takes an input from the previous phase and outputs intermediate data to the next one. It is an MPI-based engine and therefore Montage's workflow is highly dependent on the data migration between processes. The exchange of data between executables is performed by sharing temporary files in the Flexible Image Transport System (FITS) format via the storage system. At the end, a final result is persisted as the final jpeg image. The I/O workload consists of both read and write operations using either POSIX or MPI independent I/O.

(4) K-means clustering (node-local, read-intensive)}: This application is a typical and widely used BigData kernel that iteratively groups datapoints into disjoint sets. The input datapoints can be numerical, nodes in a graph, or set of objects (e.g., images, tweets, etc.,). Implementations using the MapReduce framework remain the most popular clustering algorithm because of the simplicity and performance. The algorithm reads the input dataset in phases and each node computes a set of means, broadcasts them to all machines in the cluster and repeats until convergence. The I/O workload is read-intensive and is performed on data residing on the node locally. K-means clustering is typically I/O bound.

Figure 11:
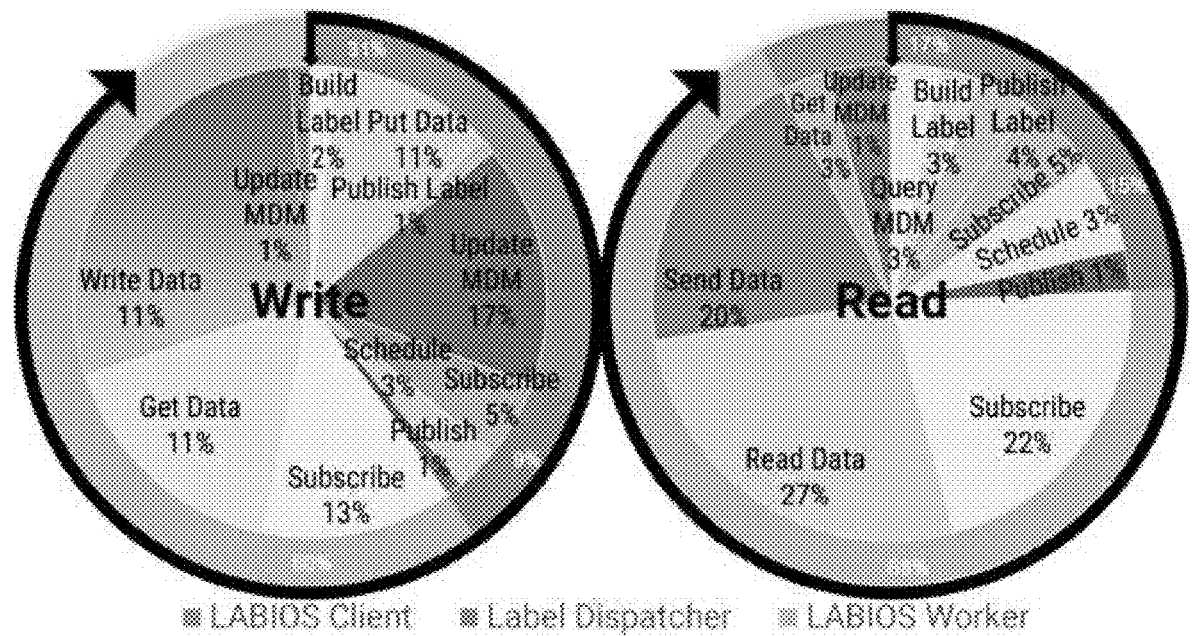
FIG. 11 shows an exemplary LABIOS operations anatomy, according to one embodiment of this invention.

FIG. 11 shows decomposition of the read and write label execution expressed as time percentage and divided by each LABIOS component. For instance, a write label starts with the LABIOS client building a label (at 12 o'clock on FIG. 11) which takes 2% of the total time, it then passes the data to the Data-Warehouse (put data 11%), publishes the label to the queue (1%), and finally updates the catalog manager (MDM) about the operation (17%). The total LABIOS client operations take 31% of the total time. The label journey continues in the label dispatcher who picks up the label from the queue (subscribe 5%), schedules it (3%), and pushes it to a specific worker's queue (publish 1\%). The most work is done by the LABIOS worker (60% of the total operation time) who first picks up the label from its queue and the data from the Data-Warehouse (get data 17%), writes the data down to the disk (29%), and finally updates the catalog manager (1%). Read label time decomposition can also be seen in FIG. 11. All results are the average time of executing a 1 MB label 10K times.

Label Dispatching

Figure 12:
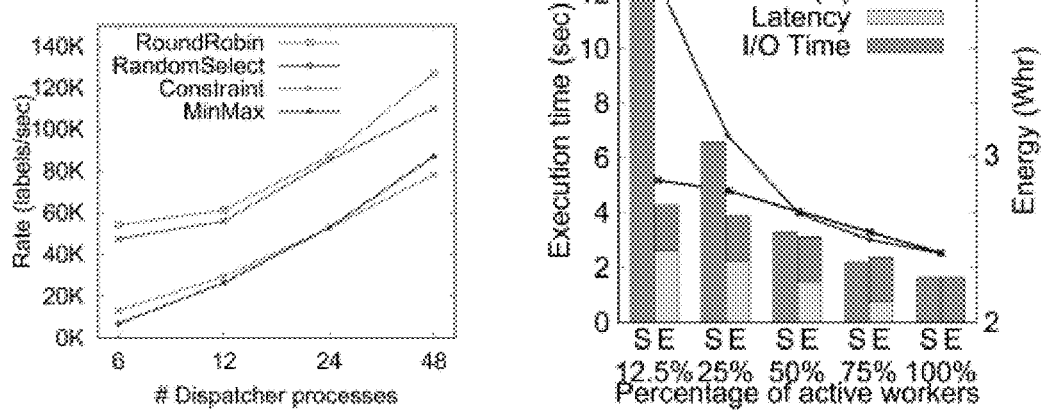
FIG. 12 summarizes results of example label dispatching and storage malleability tests.

In this test, LABIOS performs with different scheduling policies and by scaling the number of label dispatcher processes. The rate (i.e., labels per second) at which each scheduling policy handles incoming labels is recorded. LABIOS client runs on all 64 client machines, the label dispatcher is deployed on its own dedicated node, and LABIOS workers run on the 32 server machines. The time the dispatcher takes to distribute 100K randomly generated labels (i.e., mixed read and write equally sized labels) is measured. As it can be seen in the left graph of FIG. 12, all policies scale linearly as the label dispatcher processes are scaled from 6-48 (i.e., equal to max cores of the node). Round-robin and random-select achieve comparable scheduling rates between 55-125K labels per second. Constraint-based is more communication intensive since it requires exchanging information about the workers with their manager. MinMax scales better with more resources since it is more CPU intensive (i.e., DP approach).

Storage Malleability

This test shows how LABIOS elastic storage feature affects I/O performance and energy consumption. 4096 write labels of 1 MB each are issued and the total I/O time stemming from different ratios between active workers over total workers are measured (e.g., 50% ratio means that 16 workers are active and 16 are suspended). A suspended worker can be activated in about 3 seconds on average (in the testbed between 2.2-4.8 seconds). The right graph of FIG. 12 demonstrates the importance of balancing the added latency to activate more workers and the additional performance it achieves. Two worker allocation techniques are used, the static (S), where labels are placed only on the active workers, and the elastic (E), where more workers activate to serve incoming I/O. When LABIOS has a small percentage of active workers, the elastic strategy can boost performance significantly even though the latency penalty is paid to activate more workers. However, when there is a sufficient number of active workers (e.g., 75% or 24 out of 32 total workers), waking up more workers hurts the performance due to the latency penalty. This is further apparent when the energy efficiency of the system is shown, expressed in watts per hour (Whr). In the test, active workers consume 165 watts, whereas suspended workers only 16 watts. LABIOS elastic worker allocation makes sense until the 75% case where the static allocation is more energy efficient.

I/O Asynchronicity

Figure 13:
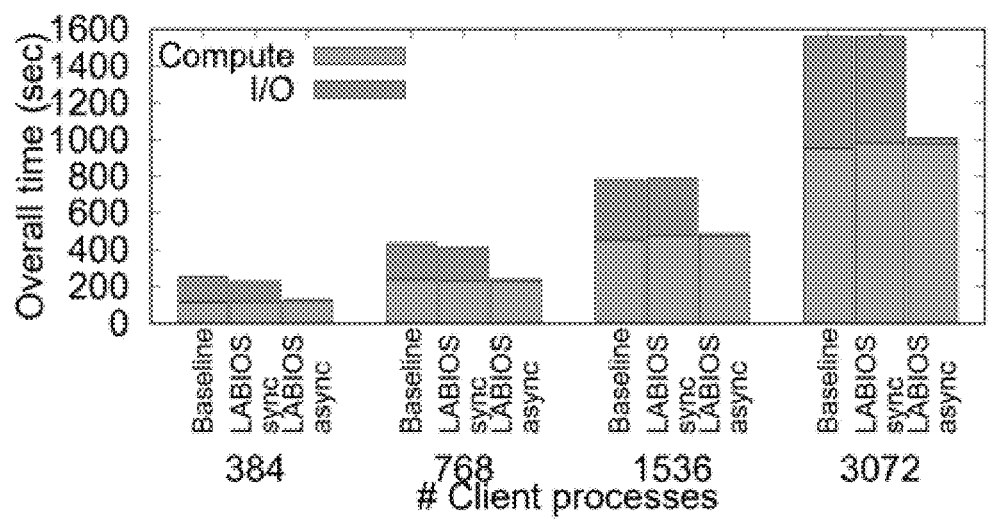
FIG. 13 summarizes results of an I/O Asynchronicity test (CM1 performance).

LABIOS supports both synchronous and asynchronous operations. The potential of a label-based I/O system is more evident by the asynchronous mode where LABIOS can overlap the execution of labels behind other computations. In this test, LABIOS is configured with the round robin scheduling policy, label granularity of 1 MB, and the label dispatcher uses all 48 cores of the node. The clients are scaled from 384 to 3072 processes (or MPI ranks in this case) to see how LABIOS scales. CM1 is run in 16 iterations (i.e., time steps) with each step first performing computing and then I/O. Each process is performing 32 MB of I/O with the total dataset size reaching 100 GB per step for the largest scale of 3072. As it can be seen in FIG. 13, LABIOS scales well with the synchronous mode, offering competitive performance when compared with our baseline, an OrangeFS deployment using the same number of storage servers (i.e., 32 servers). When LABIOS is configured in the async mode, each I/O phase can be executed overlapped with the computation of the next step. This results in a significant 16×I/O performance boost, and a 40% execution time reduction since the I/O is hidden behind computation. Note that no client code change is required. LABIOS intercepts the I/O calls and builds labels that get executed in a non-blocking fashion.

Resource Heterogeneity

Figure 14:
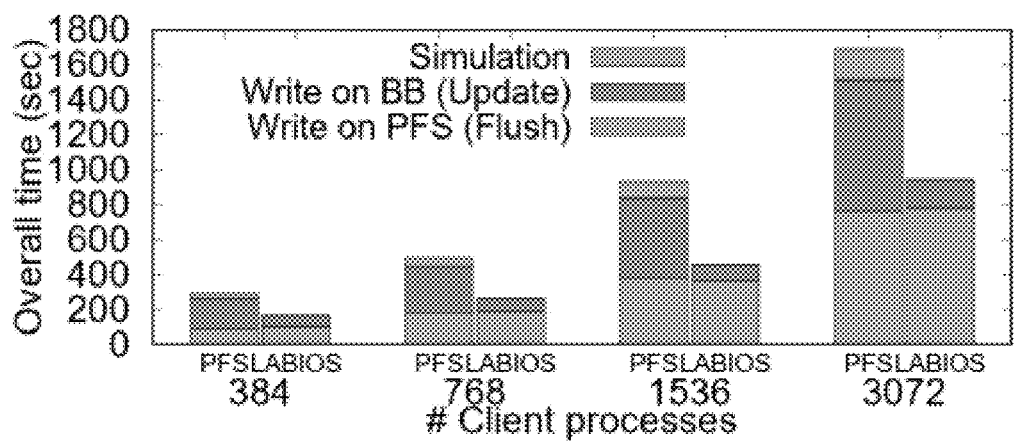
FIG. 14 summarizes results of a Resource Heterogeneity test (HACC performance).

In this test, HACC is also run in 16-time steps. At each step, HACC saves its state on the burst buffers and only at the last step persists the checkpoint data to the remote storage, an OrangeFS deployment. This workload is update-heavy. LABIOS is configured similarly as before but with support of heterogeneous workers, 8 SSD burst buffers and 32 HDD storage servers. LABIOS transparently manages the burst buffers and the servers, and offers 6×I/O performance gains, shown in FIG. 14. Moreover, worker to worker flushing is performed in the background.

Data Provisioning

Figure 15:
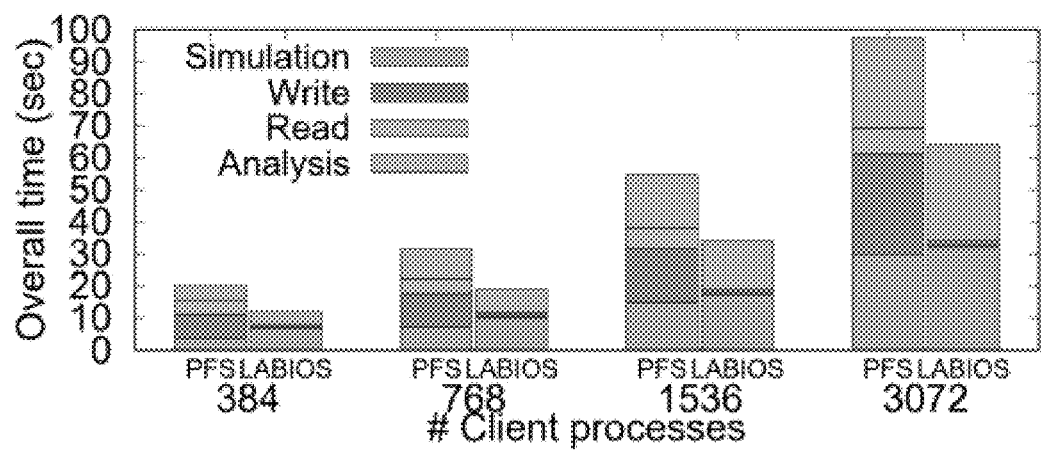
FIG. 15 summarizes results of a data provisioning test (Montage performance).

In this test, Montage, an application that consists of multiple executables that share data between them (i.e., output of one is input to another), is used. LABIOS is configured similarly to the previous set of tests. The baseline uses an OrangeFS deployment of 32 servers. In this test, the simulation produces 50 GB of intermediate data that are written to the PFS and then passed, using temporary files, to the analysis kernel which produces the final output. As it can be seen in FIG. 15, the baseline PFS spends significant time in I/O for this data sharing via the remote storage. This workflow can be significantly boosted by making the data sharing more efficient. LABIOS, instead of sharing intermediate data via the remote storage, passes the labels from the simulation to the analysis via the distributed Data-Warehouse. Each intermediate data file creates labels where the destination is not LABIOS workers but the analysis compute nodes. This accelerates the performance in two ways: a) no temporary files are created in the remote storage servers, and b) simulation and analysis can now be pipelined (i.e., analysis can start once the first labels are available). As a result, LABIOS offers 65% shorter execution time, boosts I/O performance by 17×, and scales linearly as the number of clients grow.

Storage Bridging

Figure 16:
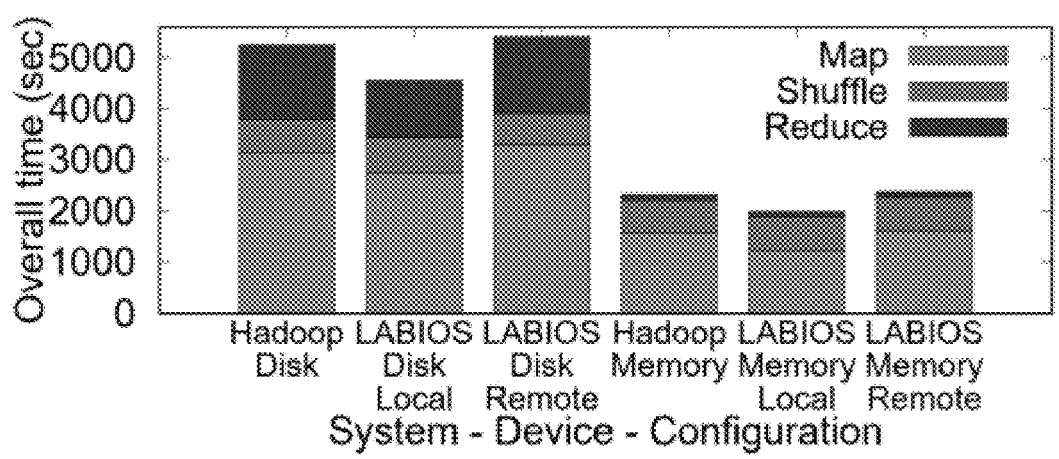
FIG. 16 summarizes results of a storage bridging test running K-means clustering.

FIG. 16 shows the results of running K-means clustering. The baseline is a 64-node HDFS cluster. LABIOS is configured in two modes: node-local I/O, similar to the HDFS cluster, and remote external storage, similar to an HPC cluster. In the first mode, LABIOS workers run on each of the 64 nodes in the cluster whereas in the second mode, data resides on an external storage running on 32 separate nodes. This application has three distinct phases: a) Map, each mapper reads 32 MB from storage, performs computations, and then writes back to the disk 32 MB of key-value pairs. b) Reduce, each reducer reads 32 MB of key-value pairs written from the mappers and performs further computations, c) Shuffle, all values across all reducers in the cluster are exchanged via the network (i.e., 32 MB network I/O). Finally, it writes the new final centroids back to the disk. An optimized version of this algorithm (i.e., Apache Mahout) avoids writing the key-value pairs back to HDFS during map phase, but instead it emits those values to the reducers avoiding excessive disk I/O (i.e., Hadoop-Memory in FIG. 16). This significantly boosts the performance of this algorithm, which is mostly read-intensive, except of the shuffling phase which is network-heavy.

LABIOS supports this workload by having each worker on every node reading the initial dataset in an optimized way by performing aggregations, much like MPI collective-PO where one process reads from storage and distributes the data to all other processes. Further, LABIOS decoupled architecture allows the system to read data from external resources (i.e., LABIOS-Disk-Remote in FIG. 16). As it can be seen in the results, reading from external sources is slower than the native node-local I/O mode but it is still a feasible configuration under LABIOS, one that leads to the avoidance of any expensive data movements or data-ingestion approach. In summary, LABIOS supports Hadoop workloads under the same cluster and offers competitive performance with the native HDFS.

Thus the invention provides an improved I/O execution system and method. By applying labels, and organizing and moving the labels in the system rather than the raw data itself, improvements in fetching ang prioritizing data can be obtained, thereby improving I/O execution efficiency.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for executing input/output (I/O) requests from clients in a distributed computing system, the method comprising:
   receiving an input/output (I/O) request made by a client for request data in a distributed data system;
   creating a data label corresponding to the I/O request, the data label including a unique identifier, a data pointer to a source and/or destination for the request data, and an operation instruction for the request data based upon the I/O request;
   pushing the data label into a distributed label queue;
   executing the operation instruction to the request data as a function of a scheduling policy of the distributed label queue.

2. The method of claim 1, further comprising dispatching the data label to a worker node for the executing the operation instruction according to the scheduling policy.

3. The method of claim 2, wherein the worker node is a storage server coordinated by a worker manager, wherein the worker manager is configured to monitor a worker node status.

4. The method of claim 2, further comprising:
   regulating the executing the operation instruction to the data by the worker node as a function of a system load and a worker node ability to execute the data label at a current point in time, wherein the worker node ability is evaluated by worker availability, worker remaining capacity, worker load, worker performance characteristics, worker energy signature, or combinations thereof.

5. The method of claim 1, further comprising temporarily placing content data corresponding to the request data in a data warehouse.

6. The method of claim 5, further comprising:
   creating a metadata entry comprising an inventory of the content data; and
   storing the metadata entry in a catalog manager, wherein the catalog manager comprises a data inventory.

7. The method of claim 1, wherein the unique identifier includes a timestamp given at creation of the data label, and further comprising:
the distributed label queue ordering operation of the data label as a function of the timestamp.

8. The method of claim 1, wherein the data label further comprises a status indicator.

9. The method of claim 1, further comprising forming the data label from a native or intercepted application programming interface (API) and from information of the I/O request.

10. The method of claim 1, further comprising:
pushing the request data to a data-warehouse, wherein the data-warehouse comprises a distributed hashmap configured to temporarily hold the request data; and
creating a metadata entry for the request data pushed into the data-warehouse in a catalog embodied as an inventory maintained by a catalog manager, wherein the catalog manager comprising a second distributed hashmap and configured to maintain metadata information.

11. The method of claim 1, wherein creating the data label is implemented by a label manager using a configurable size parameter within a range of minimum and maximum values, wherein the values are dependent on a plurality of system parameters selected from the group consisting of memory page size, cache size, network type, type of destination storage, or combinations thereof, wherein the size parameter can be configured to be bypassed for predetermined I/O requests including synchronous reads.

12. The method of claim 1, further comprising executing the operation instruction independent and/or decoupled from the client.

13. The method of claim 1, further comprising:
receiving the request data;
pushing content data of the request data to a data-warehouse configured to temporarily hold moving pieces of data;
creating a metadata entry for the content data in an inventory catalog, wherein the inventory catalog maintains both client and system metadata information; and
wherein the data label includes the unique identifier for the content data and the metadata entry.

14. A method for executing input/output (I/O) requests from clients in a distributed computing system, the method comprising:
receiving request data for one of the I/O requests from a client;
separating the request data into content data and metadata;
tagging the content data with an operation instruction of the one of the I/O requests;
pushing the content data to a data-warehouse configured to temporarily hold data in the system;
creating a metadata entry in an inventory catalog for the content data in the data-warehouse, wherein the inventory catalog comprises a distributed hashmap and is configured to maintain both client and system metadata information; and
creating a data label comprising the operation instruction and a unique identifier for the content data and the metadata.

15. The method of claim 14, further comprising:
pushing the data label into a distributed label queue;
dispatching the data label to a worker node according to a scheduling policy; and
executing the operation instruction of the data label by the worker node.

16. The method of claim 15, wherein the data label includes a timestamp given at creation, and further comprising:
the distributed label queue ordering operation of the data label as a function of the timestamp and the scheduling policy.

17. The method of claim 15, wherein the worker node executes the operation instruction of the data label independently without direct interaction with the client.

18. A system for input/output (I/O) requests from clients in a distributed computing system, the system comprising:
an application programming interface (API) configured to receive an I/O request from one of the clients;
a data label;
a distributed label queue;
a label manager configured to create the data label and push the data label to the distributed label queue, the data label including a unique identifier and a data pointer to a source and/or destination for a request data corresponding to the I/O request;
a worker node configured to execute the data label; and
a label dispatcher configured to dispatch the data label to the worker node according to a scheduling policy.

19. The system of claim 18, further comprising:
a worker manager configured to manage the worker node according to a load of the system and an ability of a worker node to execute the data label at a current point in time.

20. The system of claim 18, further comprising:
a data-warehouse configured to temporarily hold data, wherein the request data is uniquely identified and associated with the data label in the data-warehouse; and
an inventory catalog including client and system metadata information.

* * * * *